United States Patent [19]

Harbaugh et al.

[11] 4,131,029
[45] Dec. 26, 1978

[54] GIMBALLED COUPLING FOR LEAD SCREW AND NUT ASSEMBLY

[75] Inventors: Steven K. Harbaugh, Anaheim; Frank R. Mitchell, South Pasadena, both of Calif.

[73] Assignee: Eocom Corporation, Irvine, Calif.

[21] Appl. No.: 805,434

[22] Filed: Jun. 10, 1977

[51] Int. Cl.² ............................................. F16H 27/02
[52] U.S. Cl. ................................ 74/89.15; 308/142
[58] Field of Search ..................... 74/89.15, 18, 10.85; 308/26, 28, 142, 143, 174, DIG. 4, 140; 108/137, 143; 297/330

[56] References Cited

U.S. PATENT DOCUMENTS

| 2,093,026 | 9/1937 | Bernhard | 308/142 |
|---|---|---|---|
| 2,278,625 | 4/1942 | Traylor et al. | 308/142 |
| 2,936,894 | 5/1960 | Hertich | 308/142 X |
| 3,078,035 | 2/1963 | Bruenig | 308/142 X |
| 3,533,298 | 10/1970 | Gerber | 74/89.15 |
| 3,742,774 | 7/1973 | Blatt | 74/89.15 |
| 3,822,570 | 7/1974 | Fisher | 74/18 |
| 3,873,886 | 3/1975 | Kato | 308/26 X |
| 3,977,262 | 8/1976 | Randolph | 74/89.15 |
| 3,979,155 | 9/1976 | Sood et al. | 308/28 X |

FOREIGN PATENT DOCUMENTS 20462 3/1915 United Kingdom ................ 308/142

Primary Examiner—James T. McCall
Attorney, Agent, or Firm—Flehr, Hohbach, Test, Albritton & Herbert

[57] ABSTRACT

Gimballed coupling for use with a lead screw and nut assembly having a housing with the nut mounted in the housing and the nut threadedly engaging the lead screw. A transfer plate is provided. A thrust bearing assembly is carried by the transfer plate. First and second bearing members are provided which are disposed between the nut and the thrust bearing assembly. The first bearing member engages the housing and the second bearing member engages the thrust bearing. The first and second bearing members have cooperative spherical surfaces to permit the pivotal movement of the nut with respect to the transfer plate. Means is carried by the transfer plate and the housing for yieldably urging the housing towards the transfer plate. Additional means is provided for preventing rotation of the housing with respect to the transfer plate.

6 Claims, 2 Drawing Figures

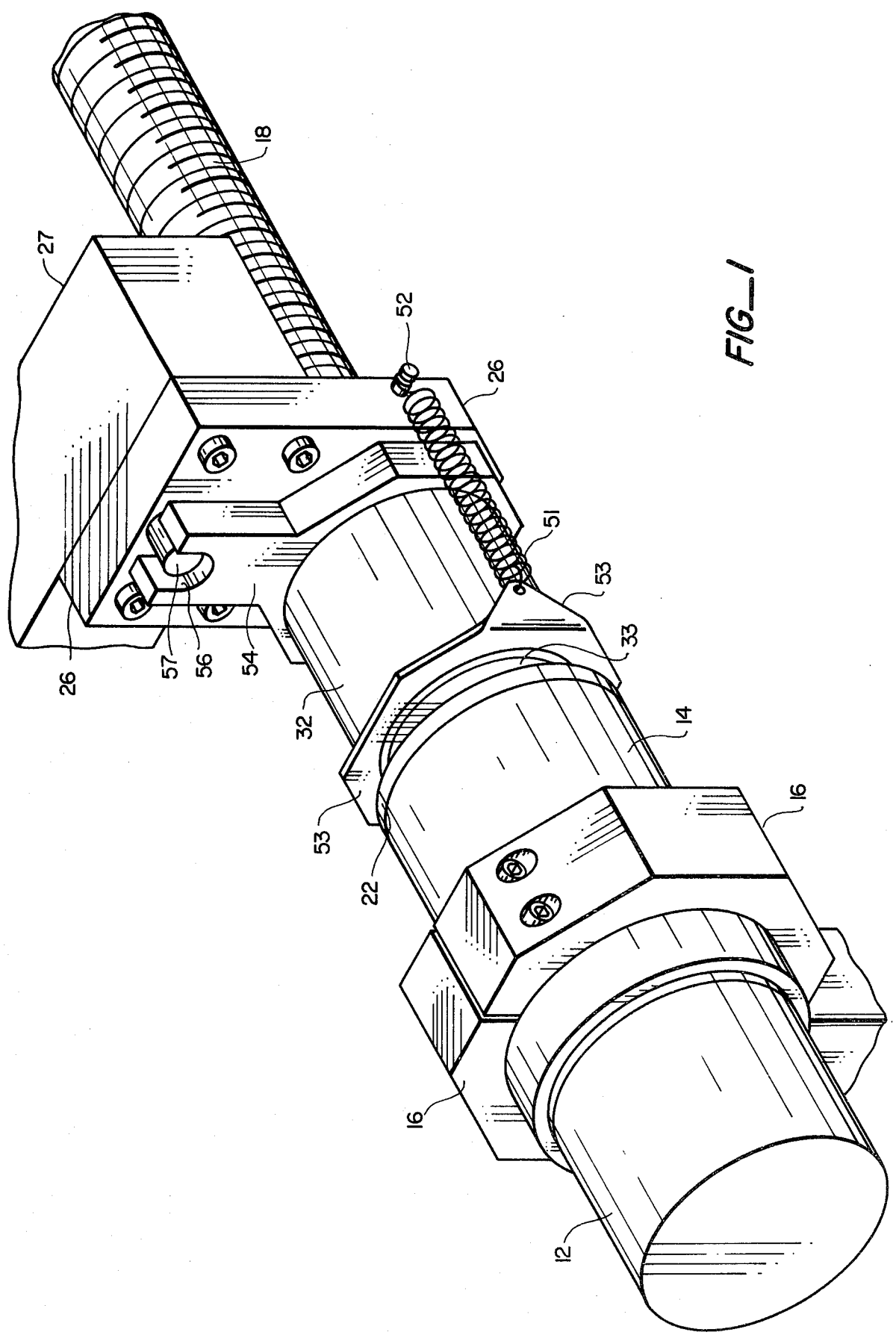

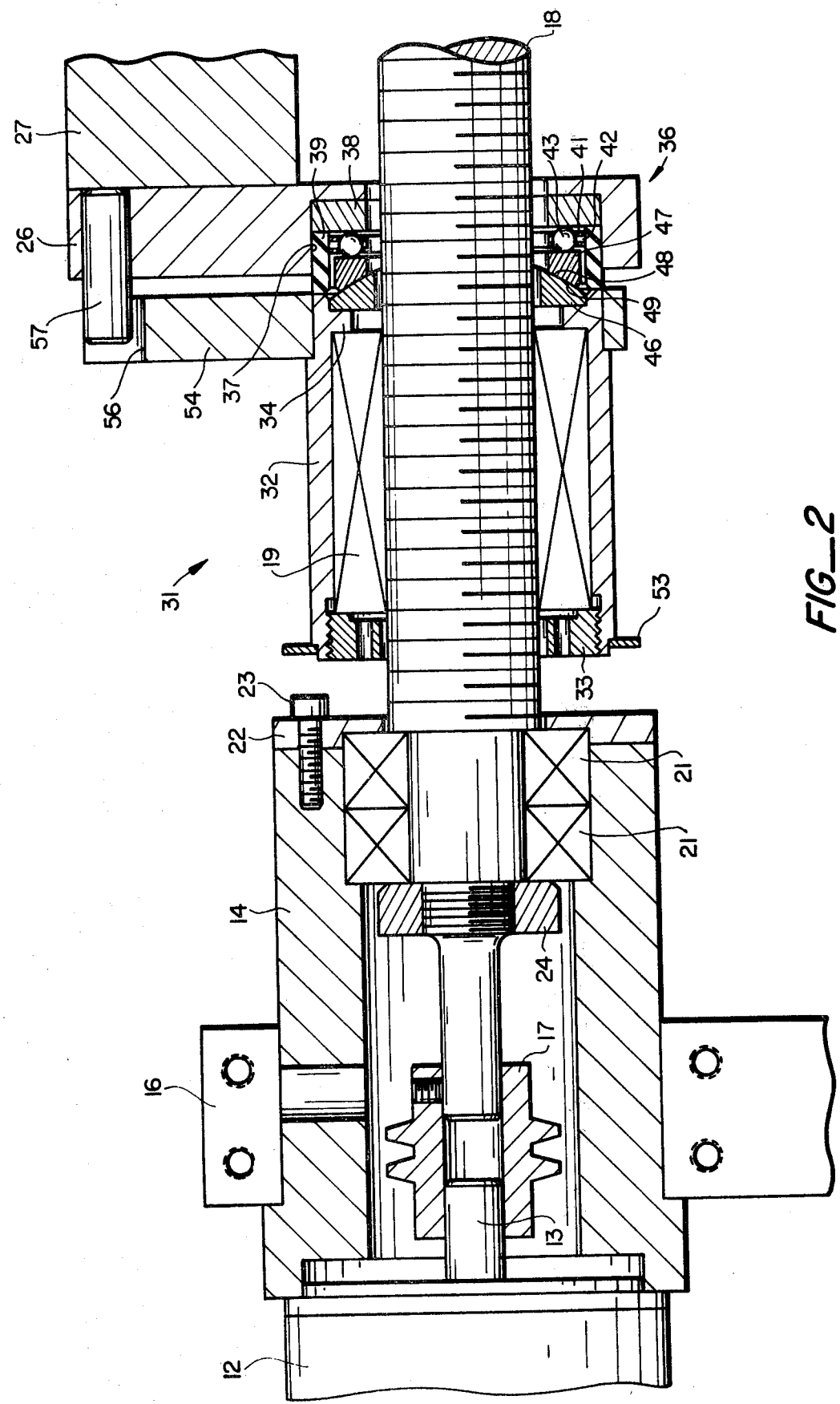
FIG_2

GIMBALLED COUPLING FOR LEAD SCREW AND NUT ASSEMBLY

BACKGROUND OF THE INVENTION

In the past the lead screw mechanisms have been utilized for providing motion to a table. In prior mechanisms, it has been necessary to maintain parallelism between the lead screw mechanism and the table. This has been very difficult to obtain. There is therefore a need for an improved coupling between the lead screw mechanism and the table which will permit misalignment.

SUMMARY OF THE INVENTION AND OBJECTS

The gimballed coupling for use with the lead screw and a nut assembly consists of a housing with the nut threaded on the lead screw being mounted in the housing. A transfer plate is provided. A thrust bearing assembly is carried by the transfer plate. First and second bearing members are disposed between the nut and the thrust bearing assembly. The first bearing member engages the housing and the second bearing member engages the thrust bearing assembly. The first and second bearing members have cooperative spherical surfaces to permit pivotal movement of the nut with respect to the transfer plate. Spring means is carried by the transfer plate and the housing for yieldably urging the housing towards the transfer plate. Means is also provided for preventing rotation of the housing with respect to the transfer plate. The thrust bearing assembly includes a bearing surface for permitting movement of the second bearing member at right angles with respect to the lead screw.

In general, it is an object of the present invention to provide a gimballed coupling for use with a lead screw and nut assembly which gives greater freedom of movement with respect to the driven member which is driven by the nut.

Another object of the invention is to provide a coupling of the above character which permits pivotal movement, rotational movement and lateral movement of the driven member with respect to the nut.

Another object of the invention is to provide a coupling of the above character in which there is substantially no freedom of movement along the direction of travel of the nut on the lead screw.

Another object of the invention is to provide coupling of the above character in which the nut is able to rotate with respect to driven member.

Additional objects and features of the invention will appear from the following description in which the preferred embodiment is set forth in detail in conjunction with the accompanying drawings.

BRIEF DESCRIPTION OF THE DRAWINGS

FIG. 1 is an isometric view of a drive assembly have a gimballed coupling therein incorporating the present invention.

FIG. 2 is a cross sectional view of the gimballed coupling shown in FIG. 1.

DESCRIPTION OF THE PREFERRED EMBODIMENT

The drive assembly 11 which is shown in FIG. 1 is of the type which is utilized as disclosed in the copending application, Ser. No. 805,433, filed June 10, 1977, for causing relative movement between an optical table and a rectangular framework. As described therein, it includes a drive motor 12 which has an output shaft 13. The drive motor 12 is mounted upon bearing housing 14 which is carried by a support bracket 16. The output shaft 13 is coupled by a bellows type coupling 17 to one end of a lead screw 18. The lead screw 18 is of a conventional type known to those skilled in the art and can have any number of threads as, for example, sufficient threads so that a nut 19 threadedly mounted thereon is advanced one inch for each five rotations of the lead screw.

One end of the lead screw is rotatably supported by a pair of bearing assemblies 21 mounted within the housing and retained therein by an end plate 22 secured to the housing 14 by cap screws 23. The end of the lead screw is retained in the bearing assembly 21 by a nut 24 which is threaded onto the lead screw as shown in FIG. 2. A transfer plate 26 is provided which is secured to a transfer block 27 for imparting motion to the block 27 which is longitudinal of the lead screw 18. The block 27 as described in copending application, Ser. No. 805,433, filed June 10, 1977, can be secured to an optical table so as to cause longitudinal movement of the table as the lead screw 18 is rotated by the drive member 12.

A gimballed coupling 31 is provided for forming a gimballed connection between the nut 24 and the transfer plate 26. This gimballed coupling 31 which comprises the present invention is formed of a housing 32 that encloses the lead screw nut 19. The lead screw nut 19 is retained or captivated within the housing 32 by a retaining nut 33 which engages the lead screw nut 19 and is threaded into one end of the cylindrical housing 32 to retain the lead screw nut 19 within the housing 32. The housing 32 is provided with an inwardly extending annular shoulder 34 which is engaged by the other end of the lead screw nut 19.

A thrust bearing assembly 36 is carried in a cylindrical recess 37 provided in the transfer plate 26. The thrust bearing assembly 36 consists of a thrust bearing 38 which is seated in the recess 37. A bumper ring 39 is mounted within the recess 37 and has one end engaging the thrust ring 38 and has another end which can be engaged by one end of the housing 32 to serve as a bumper or stop. An annular member 41 is seated within the bumper ring 39 and is also seated against the thrust ring 38. It is provided with the plurality of circumferentially spaced holes 42 in which there are provided ball bearings 43. The bearings 43 are of a size so that the outer spherical surfaces extend beyond the outer side margins of annular member 41 so that the bearings 43 provide bearing surfaces for purposes hereinafter described.

First and second bearing members 46 and 47 are disposed between the end of the housing 32 and the transfer plate 26 and in particular with respect to the annular shoulder 34 provided in the housing 32 and the bearing surfaces provided by the ball bearings 43 in the transfer plate 26. The first bearing member 46 is mounted within the end of the housing 32 which is remote from the end in which the nut 33 is mounted. The second bearing member 47 is disposed within the bumper ring 39 and engages the surfaces of the ball bearings 43. The first and second bearing members 46 and 47 are provided with cooperative spherical surfaces. Thus the first bearing member 46 is provided with a convex spherical surface 48 whereas the second bearing member 47 is provided with a concave spherical surface 49 which can mate with the surface 48. It will be noted that the second bearing member has an outer diameter which is less than the inner diameter of the bumper ring so that there is a space provided between the same so as to permit lateral movement of the second member with respect to the bumper ring by movement on the ball bearings 43. It will be noted that the first and second bearing members, the annular member 41 and the thrust ring 38 all have holes of a substantially larger diameter than the lead screw 18 through which the lead screw extends.

Means is provided for yieldably urging the housing 32 towards the transfer plate 26 and consists of a spring 51 which has one end secured to an anchor pin 52 mounted in the transfer plate 26 and has the other end secured to a spring hanger 53 mounted on the end of the housing 32 which has the nut 33 threaded therein. It can be seen that the spring 52 applies a yieldable force to maintain the first and second bearing members 46 and 47 in engagement with each other.

Means is also provided for preventing rotation of the housing 32 and the nut 19 mounted therein with respect to the transfer plate 26 and consists of an anti-rotation arm 54 which is secured to the housing. The arm 54 in its upper extremity is provided with a slot 56. The slot 56 receives a pin 57 carried by the transfer plate 26.

Operation and use of the gimballed coupling may now be briefly described. Let it be assumed a gimballed coupling is to be utilized with a lead screw and nut assembly in which the nut 19 is threadedly mounted on the lead screw 18. Let it also be assumed that the transfer plate 26 is to be utilized for transferring motion to an optical table through a transfer block 27 as described in copending application, Ser. No. 805,433, filed June 10, 1977. It can be seen that rotation of the lead screw 18 by operation of the motor 14 will cause the nut 19 to be advanced longitudinally and axially of the lead screw 18. By provision of the gimballed coupling 31, it is possible to drive the transfer plate 26 without maintaining exact parallelism between the optical table driven by the plate and the lead screw 18. This is made possible by the gimballed coupling which is provided therein, the spherical bearing surfaces carried by the first and second bearing members 46 and 47 and by the thrust bearing surfaces provided by the captured ball bearings 43. Because of these bearing surfaces which are provided it can be seen that the gimballed coupling can accommodate pivotal movement of the housing 32 with respect to the transfer plate 26. It also can accommodate rotation of the housing 32 with respect to the transfer plate 26. In addition, it can accommodate lateral motion or, in other words, motion at right angles to the longitudinal axis of the shaft 18 by the interaction between the thrust bearings 43 and the second bearing member 47. Since the gimballed coupling will permit these various types of motion, it is possible for the gimballed coupling to accommodate misalignment in any direction as well as rotational misalignment. This greatly facilitates the mounting of lead screws and nut assemblies upon mechanisms for causing traveling motion between mechanisms.

It can be seen that the gimballed coupling is of relatively simple construction and can be readily assembled and disassembled.

What is claimed is:

1. In the combination of a gimballed coupling and a lead screw and nut assembly, the lead screw and nut assembly comprising a lead screw and a nut threadedly mounted on the lead screw, said lead screw being adapted to be driven for imparting motion to the nut axially of the lead screw, the gimballed coupling comprising a housing captivating said nut, a transfer plate, a thrust bearing assembly carried by the transfer plate, first and second bearing members disposed between the nut and the thrust bearing assembly, said first bearing member engaging said housing, said second bearing member engaging said thrust bearing assembly, said first and second bearing members having cooperative generally spherical surfaces, means carried by the transfer plate and the housing for yieldably urging the housing towards the transfer plate so that the first and second bearing members have their cooperative spherical surfaces in engagement with each other and means for preventing rotation of said housing with respect to said transfer plate.

2. A coupling as in claim 1 wherein said thrust bearing assembly includes means for permitting movement of said second bearing member laterally of the shaft.

3. A coupling as in claim 2 wherein said thrust bearing assembly includes an annular member and a plurality of ball bearings circumferentially spaced in said annular member and being engaged by said second bearing member.

4. A coupling as in claim 1 together with a bumper ring carried by the transfer plate, said bumper ring being adapted to be engaged by the housing, said second bearing member being disposed within the bumper member.

5. In an assembly of the character described, a lead screw, a nut threadedly mounted on the lead screw, a housing capturing said nut, a transfer plate, a thrust bearing assembly carried by said transfer plate, first and second bearing members disposed between said nut and said thrust bearing assembly, said first bearing member engaging said housing, said second bearing member engaging said thrust bearing assembly, said first and second bearing members having cooperative generally spherical surfaces in engagement with each other, means carried by said transfer plate and said housing for yieldably urging the housing towards the transfer plate so that said cooperative spherical surfaces of said first and second bearing members are maintained in engagement with each other and means for preventing rotation of said housing with respect to said transfer plate.

6. An assembly as in claim 5 wherein said thrust bearing assembly includes a plurality of ball bearings engaged by said second bearing member and permitting lateral movement of said second bearing member with respect to said thrust bearing assembly.

* * * * *